United States Patent
Liu et al.

(10) Patent No.: US 8,897,141 B2
(45) Date of Patent: Nov. 25, 2014

(54) NETWORK SYSTEM AND ROUTING METHOD

(71) Applicants: Inventec (Pudong) Technology Corporation, Shanghai (CN); Inventec Corporation, Taipei (TW)

(72) Inventors: Te-Yen Liu, Taipei (TW); Chien-Chih Lin, Taipei (TW)

(73) Assignees: Inventec (Pudong) Technology Corporation, Shanghai (CN); Inventec Corporation, Taipei (TW)

( * ) Notice: Subject to any disclaimer, the term of this patent is extended or adjusted under 35 U.S.C. 154(b) by 152 days.

(21) Appl. No.: 13/794,057

(22) Filed: Mar. 11, 2013

(65) Prior Publication Data

US 2014/0140216 A1    May 22, 2014

(30) Foreign Application Priority Data

Nov. 20, 2012  (CN) .......................... 2012 1 0473295

(51) Int. Cl.
  *H04L 12/28* (2006.01)
  *H04L 12/801* (2013.01)
  *H04L 12/729* (2013.01)
  *H04L 12/751* (2013.01)
  *H04L 12/721* (2013.01)
  *H04L 12/717* (2013.01)

(52) U.S. Cl.
  CPC .............. *H04L 47/12* (2013.01); *H04L 45/125* (2013.01); *H04L 45/02* (2013.01); *H04L 45/123* (2013.01); *H04L 45/42* (2013.01)
  USPC ........................................................ 370/238

(58) Field of Classification Search
  USPC ........................................................ 370/238
  See application file for complete search history.

(56) References Cited

U.S. PATENT DOCUMENTS

| 5,933,425 | A | * | 8/1999 | Iwata .............................. 370/351 |
| 7,242,679 | B1 | | 7/2007 | Cortez et al. |
| 7,995,481 | B2 | * | 8/2011 | Kokje et al. .................... 370/238 |
| 8,130,657 | B2 | * | 3/2012 | Mosko ........................... 370/238 |
| 2004/0205239 | A1 | | 10/2004 | Doshi et al. |
| 2009/0257365 | A1 | * | 10/2009 | Hwang et al. ................. 370/256 |
| 2011/0038306 | A1 | * | 2/2011 | Potkonjak ..................... 370/328 |
| 2011/0164546 | A1 | * | 7/2011 | Mishra et al. ................. 370/312 |
| 2012/0008503 | A1 | | 1/2012 | Qiu et al. |
| 2012/0137021 | A1 | | 5/2012 | Chiueh et al. |
| 2013/0024561 | A1 | * | 1/2013 | Imai .............................. 709/224 |

* cited by examiner

*Primary Examiner* — Farah Faroul
(74) *Attorney, Agent, or Firm* — Huffman Law Group, PC

(57) ABSTRACT

The routing method includes: receiving identification information of nodes to construct a network topology diagram and receiving support rates of connection ports through a controller; monitoring data rates of the connection ports through the controller; receiving a route planning request through the controller; separately calculating costs of links according to the data rates of the connection ports and the support rates of the connection ports after receiving the route planning request through the controller; searching a plurality of candidate paths between a source-destination pair according to the route planning request and the network topology diagram through the controller; summing the costs of links passed by each candidate path to acquire a sum of link-cost of each candidate path through the controller; and, selecting one of the candidate paths with the smallest sum of link-cost as a packet transmitting path between the source-destination pair through the controller.

10 Claims, 2 Drawing Sheets

NETWORK SYSTEM AND ROUTING METHOD

RELATED APPLICATIONS

This application claims priority to Chinese Application Serial Number 201210473295.5, filed Nov. 20, 2012, which is herein incorporated by reference.

BACKGROUND

1. Field of Invention

The present invention relates to an electronic system and a routing method. More particularly, the present invention relates to a network system and a routing method.

2. Description of Related Art

With the rapid development of information technology, networks of various forms, such as local area networks, Internets, data center networks, and the like, have been applied widely within the art.

Generally, a network includes plural nodes, such as switches or routers. These nodes are generally provided with a forwarding table. These nodes compare headers of packets at the receipt of these packets according to the individual forwarding tables, and forward the packets to other nodes. The forwarding tables may be manually set by a network manager, or be set through performing a specific algorithm. Therefore, how to design a route planning method to properly set the forwarding tables of the nodes in the network, to prevent network congestion, and to promote the reliability of the network is desirable.

SUMMARY

An aspect of the present invention provides a routing method. The routing method uses a controller to collect the data rates and the support rates of connection ports of the nodes (for example, switches or routers) in the network and plan out a transmitting path between a source-destination pair according to the data rates and the support rates of the connection ports.

According to an embodiment of the present invention, the routing method is applied to a network system. The network system includes a plurality of nodes and a controller. Each of the plurality of nodes comprises at least one connection port. every two adjacent nodes are connected through the at least one connection port of the plurality of nodes to form a plurality of links. The routing method includes: transmitting identification information of the plurality of nodes and support rates of the at least one connection port of the plurality of nodes to the controller through the plurality of nodes; receiving the identification information to construct a network topology diagram and receiving the support rate of the at least one connection port of the plurality of nodes through the controller; monitoring data rates of the at least one connection port of the plurality of nodes through the controller; receiving a route planning request through the controller; respectively calculating costs of the plurality of links according to the data rates of the at least one connection port of the plurality of nodes and the support rates of the at least one connection port of the plurality of nodes after receiving the route planning request through the controller; searching a plurality of candidate paths between a source-destination pair according to the route planning request and the network topology diagram through the controller; summing the costs of the plurality of links passed by each candidate path to acquire a sum of link-cost of each candidate path through the controller; and selecting one of the candidate paths with the smallest sum of link-cost as a packet transmitting path between the source-destination pair through the controller.

According to an embodiment of the present invention, the step of monitoring the data rates of the at least one connection port of the plurality of nodes includes: receiving a first cumulative data rate of one of the at least one connection port of one of the plurality of nodes at a first time point through the controller; and receiving a second cumulative data rate of the one of the at least one connection port of the one of the plurality of nodes at a second time point through the controller.

According to an embodiment of the present invention, the step of respectively calculating the costs of the plurality of links includes: dividing the difference between the first cumulative data rate and the second cumulative data rate by the difference between the first time point and the second time point, so as to obtain an average data rate of the one of the at least one connection port of the one of the plurality of nodes through the controller; subtracting the average data rate of the one of the at least one connection port of the one of the plurality of nodes from the support rate of the one of the at least one connection port of the one of the plurality of nodes, so as to obtain a residual data rate of the one of the at least one connection port of the one of the plurality of nodes through the controller; and dividing the residual data rate of the one of the at least one connection port of the one of the plurality of nodes by the support rate of the one of the at least one connection port of the one of the plurality of nodes through the controller, so as to acquire one of the costs of the links corresponding to the one of the at least one connection port of the one of the plurality of nodes.

According to an embodiment of the present invention, the step of selecting one of the candidate paths with the smallest sum of link-cost as a packet transmitting path between the source-destination pair through the controller includes: respectively writing at least one packet forwarding rule respectively into at least one forwarding table of the one of the plurality of nodes passed by the one of the candidate paths with the smallest sum of link-cost according to the one of the candidate paths with the smallest sum of link-cost through the controller.

According to an embodiment of the present invention, the routing method further includes: setting a failure time of at least one packet forwarding table through the controller, so that the packet transmitting path between the source-destination pair is updated along with time.

Another aspect of the present invention provides a network system. The network system can use a controller to collect the data rates and the support rates of the connection ports of the nodes in the network system and plan out a transmitting path between a source-destination pair according to the data rates and the support rates of the connection ports.

According to an embodiment of the present invention, the network system includes a plurality of nodes and a controller. Each of the plurality of nodes comprises at least one connection port. Every two adjacent nodes are connected through the at least one connection port of the plurality of nodes to form a plurality of links. The plurality of nodes are used for respectively outputting identification information of the plurality of nodes and support rates of the at least one connection port of the plurality of nodes to the controller. The controller is used for receiving the identification information to construct a network topology diagram, receiving the support rate of the at least one connection port of the plurality of nodes, monitoring data rates of the at least one connection port of the plurality of nodes, and receiving a route planning request. After receiving the route planning request, the controller respectively calculating costs of the plurality of links according to the data rates of the at least one connection port of the plurality of nodes and the support rates of the at least one connection port of the plurality of nodes. Furthermore, the controller searches a plurality of candidate paths between a source-destination pair according to the route planning request and the network topology diagram. The controller sums the costs of the plurality of links passed by each candidate path to acquire a sum of link-cost of each candidate path. Subsequently, the controller selects one of the candidate paths with the smallest sum of link-cost as a packet transmitting path between the source-destination pair.

According to an embodiment of the present invention, the controller is further used for receiving a first cumulative data rate of one of the at least one connection port of one of the plurality of nodes at a first time point; receiving a second cumulative data rate of the one of the at least one connection port of the one of the plurality of nodes at a second time point; and dividing the difference between the first cumulative data rate and the second cumulative data rate by the difference between the first time point and the second time point, so as to acquire an average data rate of the one of the at least one connection port of the one of the plurality of nodes.

According to an embodiment of the present invention, the controller is further used for subtracting the average data rate of the one of the at least one connection port of the one of the plurality of nodes from the support rate of the one of the at least one connection port of the one of the plurality of nodes, so as to acquire a residual data rate of the one of the at least one connection port of the one of the plurality of nodes; and dividing the residual data rate of the one of the at least one connection port of the one of the plurality of nodes by the support rate of the one of the at least one connection port of the one of the plurality of nodes, so as to acquire one of the costs of links corresponding to the at least one connection port of the one of the plurality of nodes.

According to an embodiment of the present invention, the controller is further used for respectively writing at least one packet forwarding rule respectively into at least one forwarding table of the one of the plurality of nodes passed by the one of the candidate paths with the smallest sum of link-cost according to the one of the candidate paths with the smallest sum of link-cost.

According to an embodiment of the present invention, the controller is further used for setting a failure time of at least one packet forwarding rule, so that the packet transmitting path between the source-destination pair is updated along with the time.

Thus, through application of one of the embodiments mentioned above, the controller can calculate the costs of the links according to the data rates of the links between all the nodes in the network and the support rates of the connection ports. Moreover, the controller can plan out the transmitting path between a source-destination pair according to the costs of the links, to make the packet between the source-destination pair be transmitted along the candidate path with the smallest sum of link-cost. Therefore, the data rate load in the network is balanced, so that the network congestion is prevented and the reliability of the network is promoted.

DETAILED DESCRIPTION

The spirit of the disclosure will be described clearly in the following detailed description with reference to the drawings. After learning the embodiments of the disclosure, those of skills in the art can make variations and modifications with reference to the technology taught in the disclosure, without departing from the spirit and scope of the disclosure.

The phrases "first," "second," and the like used herein do not specifically indicate an order or sequence, as well as not being used for limiting the present invention, and are only used for distinguishing elements or operations described with the same technical terms.

An implementing aspect of the present invention provides a network system. The network system can use a controller to collect data rates and support rates of nodes (for example switches or routers) in the network system and to plan out a transmitting path between a source-destination pair according to the data rates and the support rates of connection ports.

Figure 1:
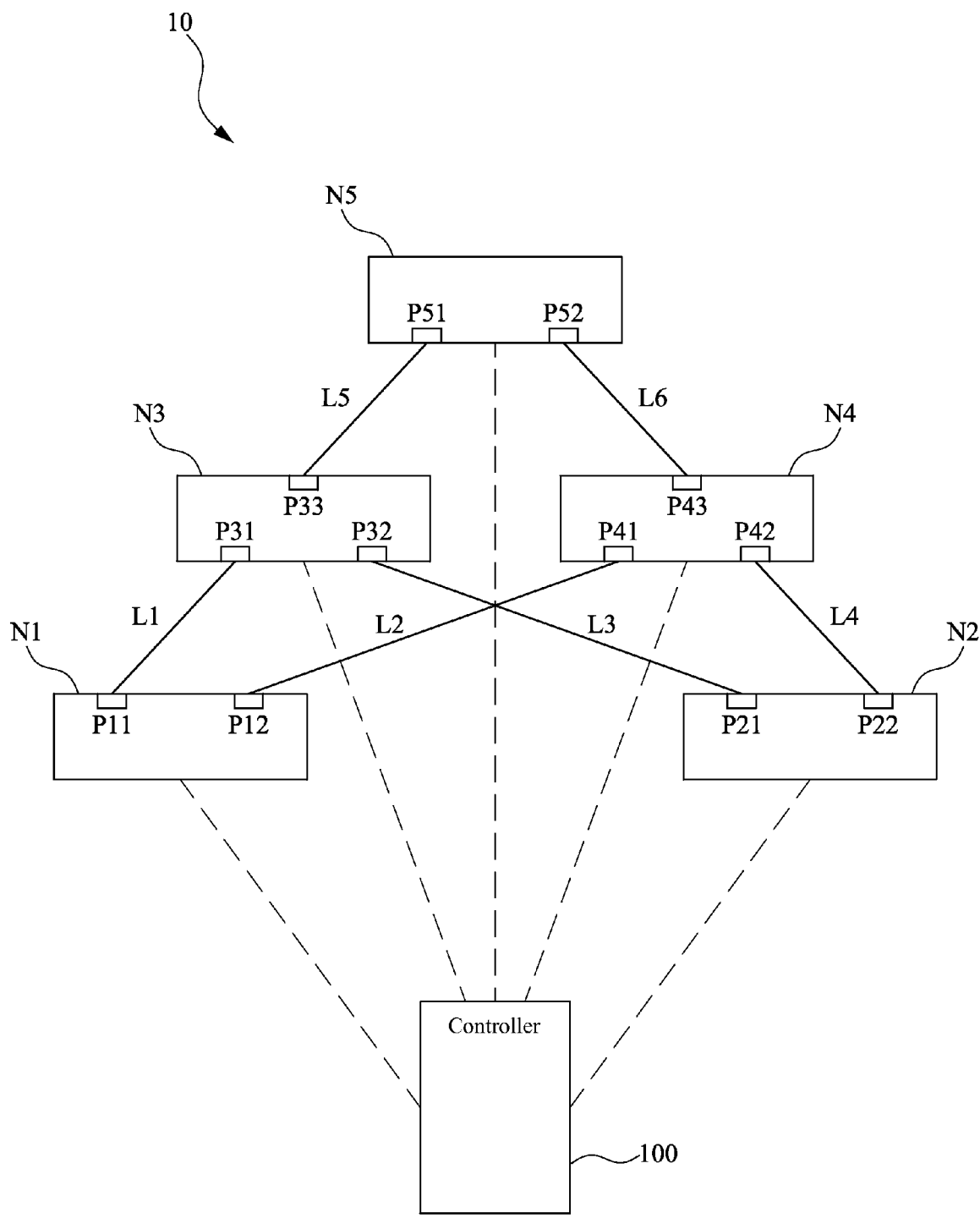
FIG. 1 is a schematic diagram of a networks system illustrated according to an embodiment of the present invention.

FIG. 1 is a schematic diagram of a network system illustrated according to an embodiment of the present invention. The network system 10 includes a controller 100 and a plurality of nodes, for example N1-N5. Each of the nodes N1-N5 includes at least one connection port. For example, the node N1 includes the connection ports P11 and P12. The node N2 includes the connection ports P21 and P22. The controller 100 is connected to each of the nodes N1-N5. Every two adjacent ones of nodes N1-N5 are connected through the corresponding connection ports to form links. For example, the node N1 and the node N3 are connected through the connection ports P11 and P31 to form the link L1. The node N1 and the node N4 are connected through the connection ports P12 and P41 to form the link L2. The so-called adjacent nodes herein refer to two nodes which can be connected with each other through a single link. Additionally, the nodes N1-N5 mentioned above may be compatible with the OpenFlow layer 2 communications protocol, such as OpenFlow switches or routers, and the controller mentioned above may be an OpenFlow controller.

It should be noted that although this embodiment is described by taking the connection model in the FIG. 1 as an example, the quantity of the nodes, the quantity of the connection ports of the nodes, and the connection relation between the nodes are not limited to the quantities depicted in the figure.

In this embodiment, the controller 100, for example, is a computer. The controller 100 can send an instruction to the nodes N1-N5 to instruct the nodes N1-N5 to respectively output to the controller 100 identification information of the nodes N1-N5 and support rates of the connection ports P11-P52. Next, the controller 100 can receive the identification information of the nodes N1-N5 to construct a network topology diagram corresponding to the network system 10 and can receive the support rates of the connection ports P11-P52. The network topology diagram may reflect the connection relation among the nodes N1-N5. In practical, the controller 100 can instruct the nodes N1-N5 to broadcast a link layer discovery protocol (LLDP) packet to the adjacent nodes N1-N5 to make the adjacent nodes N1-N5 exchange the identification information of themselves with each other. Subsequently, the controller 100 can send another instruction to the nodes N1-N5 to cause the nodes N1-N5 to pass the identification information of the adjacent nodes N1-N5 back to the controller 100. As such, the controller 100 can determine the network topology diagram corresponding to the network system 10 via the identification information of the nodes N1-N5. Additionally, the controller 100 also can make the nodes N1-N5 transmit back the support rates of the connection ports P11-P52 via sending instructions to the nodes N1-N5.

Additionally, the controller 100 can be used for monitoring the data rates of the connection ports P11-P52. For example, instructions can be periodically sent to the nodes N1-N5 to cause the nodes N1-N5 to transmit the data rates of the connection ports P11-P52 to the controller 100.

The controller 100 can respectively calculate the costs of the links L1-L6 according to the support rates of the connection ports P11-P52 and the data rates thereof based on the received support rates of the connection ports P11-P52 and the periodically collected data rates of the connection ports P11-P52 after receiving a route planning request. For example, the controller 100 can determine the congestion level of the corresponding links L1-L6 through the support rates of the connection ports P11-P52 and the data rates thereon, and calculate the costs of the links L1-L6 accordingly.

The controller 100 can search a plurality of candidate paths between a source-destination pair according to the route planning request and the network topology corresponding to the network system 10 after calculating the costs of the links L1-L6. Furthermore, the controller sums the costs of the links L1-L6 passed by the candidate paths, so as to acquire a sum of link-cost of each candidate path. Next, the controller selects one of the candidate paths with the small sum of link-cost as a packet transmitting path between the source-destination pair. The source-destination pair corresponds to the route planning request.

For example, if the source node of the source-destination pair is N1 and the destination node thereof is N2, the controller can respectively search two candidate paths N1→N3→N2 and N1→N4→N2 from the network topology diagram corresponding to the network system 10, and sum the costs of the links. If the sum of the link-cost of the candidate path N1→N3→N2 is smaller than that of the candidate path N1→N4→N2, the controller 100 selects the candidate path N1→N4→N2 as the packet transmitting path between the source-destination pair above.

Through the setting above, when planning the transmitting path between the source-destination pair above, the controller 100 can select one of the candidate paths with the smallest sum of link-cost as the packet transmitting path, so as to load balance the data rate in the network, to prevent the network congestion, and to promote the reliability of the network.

The monitoring of the data rates and the calculation of the costs of the links will be further described in the following paragraphs.

In an embodiment of the present invention, the nodes N1-N5 can store statistical data respectively. The statistical data may include the cumulative data rates (for example, received bytes of each port in an OpenFlow table) of the connection ports P11-P52 of the nodes N1-N5. The controller 100 can periodically receive the cumulative data rate of each of the connection ports P11-P52 of the nodes N1-N5. When receiving an instruction (for example the route planning request), the controller calculates the costs of the links L1-L6. In other words, when receiving the instruction, the controller 100 divides the difference between the newest received cumulative data rate of one of the ports P11-P52 and the secondarily newest received cumulative data rate of the one of the ports P11-P52 by the time interval between the receipts of the two cumulative data rates, to acquire the average data rate of the one of the ports P11-P52.

Taking the connection port P11 as an example, the controller 100 can receive the first cumulative data rate of the connection port P11 of the node N1 at the first time point (for example, at the $0^{th}$ second moment). Subsequently, after a preset period (for example 30 seconds), the controller can receive the second cumulative data rate of the connection port P11 of the node N1 again at the second time point (for example at the $30^{th}$ second moment). At this moment, if receiving the route planning request for calculating the costs of the links L1-L6, the controller 100 can divide the difference between the first cumulative data rate and the second cumulative data rate by the difference between the first time point and the second time point, to acquire the average data rate of the connection port P11. Next, the controller 100 can subtract the average data rate of the connection port P11 from the support rate of the connection port P11, to acquire the residual data rate of the connection port P11; and divide the residual data rate of the connection port P11 by the support rate of the connection port P11 to acquire the cost of the link L1 corresponding to the connection port P11.

As such, when the support rate of the connection port P11 is far greater than the average data rate of the connection port P11, the cost of the link L1 is low; while when the support rate of the connection port P11 is marginally greater than the average data rate of the connection port P11, the link L1 has already been in the congestion state, and the cost of the link L1 is high.

In the same way, the controller 100 can acquire the costs of the links L1-L6. It should be noted that since the controller 100 periodically and constantly receives the cumulative data rates of the connection ports P11-P52 of the nodes N1-N5, and further calculates the average data rates according to the newest received cumulative data rate and the secondarily newest received data rate, the costs of the links L1-L6 may be dynamically changed along with the time.

Additionally, in an embodiment of the present invention, each of the nodes N1-N5 may include a forwarding table (e.g., an OpenFlow flow table), used for storing zero or more packet forwarding rules (e.g., OpenFlow flow entries). The nodes N1-N5 can forward the packets according to the packet forwarding rules. When a packet enters any one of the nodes N1-N5, if no packet forwarding rule corresponds to the packet in the nodes N1-N5, the nodes N1-N5 can send the route planning request to the controller 100. In some embodiments, the route planning request may include the data of a source-destination pair. The source node of the source-destination pair, for example, is one of the nodes N1-N5 transmitting the route planning request. The destination node, for example, is one of the nodes N1-N5 at which the packet wants to arrive.

The controller 100 can respectively calculate the costs of the links L1-L6 according to the data rates of the connection ports P11-P52 and the support rates of the connection ports P11-P52 after receiving the route planning request. Furthermore, according to the route planning request, the network topology diagram corresponding to the network system 10 and the costs of the links L1-L6, the controller 100 performs a shortest path first algorithm for the source-destination pair, to search one of the candidate paths with the smallest sum of link-cost as the packet transmitting path between a source-destination pair. The controller 100, for example, performs the shortest path first algorithm (for example, the Dijkstra algorithm) for the source-destination pair mentioned above with the weights being the costs of the links L1-L6.

Subsequently, the controller 100 can respectively write at least one packet forwarding rule corresponding to the packet transmitting path into at least one of the forwarding tables of at least one of the nodes passed by the packet transmitting path, so that the packet of the source-destination pair mentioned above can be transmitted through the packet transmitting path.

For example, in a case, the node N1 transmits a route planning request to the controller 100. The source node of the source-destination pair of the route planning request is the node N1, and the destination node thereof is the node N2. When receiving the route planning request transmitted by the node N1, the controller 100 can sum the costs of all the links L1-L6. Moreover, according to the network topology diagram corresponding to the network system 10 and the costs of the links L1-L6, the controller 100 searches one of the candidate paths with the smallest sum of link-cost as the packet transmitting path, for example, N1→N4→N2 between the node N1 and the node N2. Next, the controller 100 writes the packet forwarding rules respectively into the nodes N1 and N4 along the packet transmitting path N1→N4→N2. For example, the controller 100 can new add a packet forwarding rule to the forwarding table of the node N1 to make a packet of the source-destination pair mentioned above be sent from the connection port P12, and the controller 100 can new add a packet forwarding rule to the forwarding table of the node N4, to make the packet of the source-destination pair be sent from the connection port P42. As such, the packet of the source-destination pair mentioned above can be transmitted through the path with the lowest link cost.

Additionally, in an embodiment, the controller 100 can set a failure time of at least one of the packet forwarding rules, such that after one of the packet forwarding rules exceeds the failure time, the corresponding one of the nodes N1-N5 can remove the one of the packet forwarding rules. As such, after the removal of the packet forwarding rule, when the packet of the source-destination pair mentioned above enters the nodes N1-N5 again, as no corresponding packet forwarding rule is searched among the nodes N1-N5, the nodes N1-N5 can send the route planning request to the controller 100 again. Therefore, the controller 100 plans the packet transmitting path between the source-destination pair mentioned above again, so that the packet transmitting path between the source-destination pair may be updated along with the time.

Another implementation aspect of the present invention provides a routing method. The routing method can be applied to a network system having the same or similar structure as that in the FIG. 1. In order to facilitate describing, the following operation method is described by taking the embodiment shown in the FIG. 1 as an example, but the following operation method is not limited as depicted by the configuration of FIG. 1.

It should be noted that the steps of the following operation method are not specifically sequenced, unless otherwise specified. Additionally, the following steps also may be executed at the same time, or the execution time thereof may be overlapped.

Figure 2:
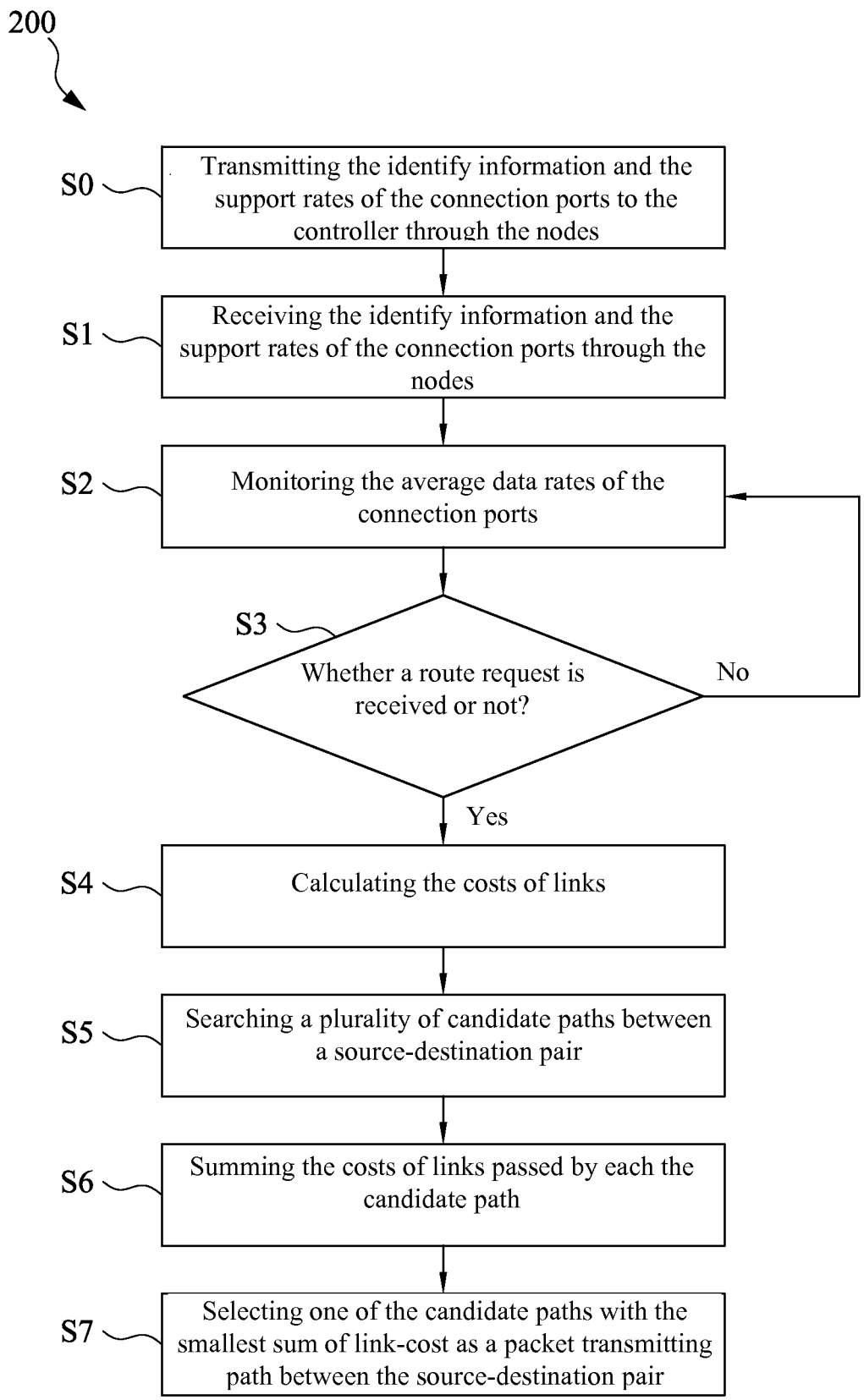
FIG. 2 is a flow chart of a routing method illustrated according to an embodiment of the present invention.

FIG. 2 is a flow chart of a routing method 200 illustrated according to an embodiment of the present invention. The routing method 200 may include steps S0-S7.

In the step S0, the nodes N1-N5 can transmit the identification information of the nodes N1-N5 and the support rates of the connection ports P11-P52 of the nodes N1-N5 to the controller 100. In the step S1, the controller 100 can receive the identification information of the nodes N1-N5 transmitted by the nodes N1-N5 to construct the network topology diagram corresponding to the network system 10 and further receive the support rates of the connection ports P11-P52 transmitted by the nodes N1-N5. For example, the controller 100 can instruct the nodes N1-N5 to broad the link layer discovery protocol (LLDP) packet to the adjacent nodes N1-N5 to make the adjacent nodes N1-N5 exchange the identification information of themselves with each other. Next, the controller 100 can send another instruction to the nodes N1-N5 to make the nodes N1-N5 to pass the identification information of the adjacent nodes NI1-N5 back to the controller 100. In this way, the controller 100 can know the network topology diagram corresponding to the network system 10 via the identification information. Also, the controller 100 can make the nodes N1-N5 to transmit back the support rates of the connection ports P11-P52 via sending instructions to the nodes N1-N5.

In the step S2, the controller 100 can monitor the data rates of the connection ports P11-P52. For example, the controller 100 can periodically (for example, at an interval of a preset period) send instructions to the nodes N1-N5 to make the nodes N1-N5 transmit the data rates of the connection ports P11-P52 to the controller 100.

Next, in the step S3, the controller 100 can determine whether a route planning request transmitted by any one of the nodes N1-N5 is received. If not, the controller 100 continues to monitor the data rates of the connection ports P11-P52. If so, the controller 100 can respectively calculate the costs of the links L1-L6 according to the data rates of the connection ports P11-P52 and the support rates of the connection ports P11-P52 (step S4). For example, the controller 100 can determine the congestion level of the corresponding links L1-L6 through the support rates of the connection ports P11-P52 and the current data rates thereon, and further calculate the costs of the links L1-L6.

Subsequently, in the step S5, the controller 100 can search a plurality of candidate paths between a source-destination pair according to the route planning request mentioned above and the network topology diagram corresponding to the network system 10. Furthermore, the controller sums the costs of the links L1-L6 passed by each candidate paths, to acquire a sum of link-cost of each candidate path (step S6). The controller 100 selects one of the candidate paths with the smallest sum of link-cost as a packet transmitting path between the source-destination pair (step S7). The source-destination pair corresponds to the route planning request mentioned above.

For example, if the source node of the source-destination pair is N1 and the destination node thereof is N2, the controller can respectively search two candidate paths N1→N3→N2 and N1→N4→N2 from the network topology diagram corresponding to the network system 10. Furthermore, the controller sums the costs of the links. If the sum of the link-cost of the candidate path N1→N3→N2 is smaller than that of the candidate path N1→N4→N2, the controller 100 selects the candidate path N1→N4→N2 as a packet transmitting path between the source-destination pair mentioned above.

Through the steps above, when planning the transmitting path between the source-destination pair mentioned above, the controller 100 can select one of the candidate paths with the smallest sum of link-cost as the packet transmitting path, so as to load balance the data rate in the network, prevent the network congestion and promote the reliability of the network.

In an embodiment of the present invention, in the step S2, the controller can periodically receive the cumulative data rates of all the connection ports P11-P52 of the nodes N1-N5. Taking the connection port P11 as example, the controller 100 can receive the first cumulative data rate of the connection port P11 of the node N1 at the first time point (for example at the $0^{th}$ second moment). Subsequently, after a preset period (for example 30 seconds), the controller 100 can receive the second cumulative data rate of the connection port P11 of the node N1 again at the second time point (for example at the $30^{th}$ second moment).

At this moment, if receiving the route planning request transmitted by the nodes N1-N5 (step S3), the controller 100 can divide the difference between the first cumulative data rate and the second cumulative data rate by the difference between the first time point and the second time point, to acquire the average data rate of the connection port P11. Next, the controller 100 can subtract the average data rate of the connection port P11 from the support rate of the connection port P11, to acquire the residual data rate of the connection port P11, and divide the residual data rate of the connection port P11 by the support rate of the connection port P11 to acquire the cost of the link L1 corresponding to the connection port P11 (step S4). In other words, the controller 100 divides the difference between the newest received cumulative data rate and the secondarily newest received cumulative data rate of the connection port P11 by the time interval between the receipts of the two cumulative data rates, to acquire the average data rate of the connection port P11. Next, the average data rate of the connection port P11 is used for calculating the cost of the link L1.

During the calculation of the cost of the links through the steps above, when the support rate of the connection port P11 is far greater than the average data rate of the connection port P11, the cost of the link L1 is low; while when the support rate of the connection port P11 is a marginally greater than the average data rate of the connection port P11, the link L1 has already been in the congestion state, and the cost of the link L1 is high.

In the same way, the controller 100 can acquire the costs of the links L1-L6. It should be noted that since the controller 100 periodically and constantly receives the cumulative data rates of all the connection ports P11-P52 of the nodes N1-N5, and further calculates the average data rates according to the newest received cumulative data rate and the secondarily newest received data rate, the costs of the links L1-L6 may be dynamically changed along with the time.

According to an embodiment of the present invention, in the step S5, after receiving the route planning request, the controller 100 can perform the shortest path first algorithm for the source-destination pair corresponding to the route planning request, according to the route planning request, the network topology diagram corresponding to the network system 10 and the costs of the links L1-L6. The candidate path with the smallest sum of link-cost is selected as the packet transmitting path of the source-destination pair. For example, the controller 100 may use the costs of the links L1-L6 as the weights, perform the shortest path first algorithm (for example, the Dijkstra algorithm) for the source-destination pair mentioned above, and select one of the candidate paths with the smallest sum of link-cost as the packet transmitting path between the source-destination pair.

Subsequently, in the step S6, the controller 100 can respectively write at least one packet forwarding rule into at least one of the forwarding tables of at least one of the nodes passed by the packet transmitting path according to the packet transmitting path. The details of the forwarding tables and the packet forwarding rules can be known by referring to the previous implementation aspect.

Additionally, in an embodiment, the routing method 200 may further include a step of setting a failure time of at least one of the packet forwarding rules through the controller 100, such that after the at least one packet forwarding rule exceeds the failure time, the corresponding one of the nodes N1-N5 can remove the one of the packet forwarding rules. As such, after the removal of the packet forwarding rule, when the packet of the source-destination pair mentioned above enters the nodes N1-N5 again, as no corresponding packet forwarding rule is searched among the nodes N1-N5, the nodes N1-N5 can send the route planning request to the controller 100 again. Therefore the controller 100 plans the packet transmitting path between the source-destination pair mentioned above again, so that the packet transmitting path between the source-destination pair may be updated along with the time.

Although the present invention has been disclosed with reference to the above embodiments, these embodiments are not intended to limit the present invention. It will be apparent to those skilled in the art that various modifications and variations can be made without departing from the scope or spirit of the present invention. Therefore, the scope of the present invention shall be defined by the appended claims.

What is claimed is:

1. A routing method, being applied to a network system, wherein the network system comprises a plurality of nodes and a controller, each of the plurality of nodes comprises at least one connection port; every two adjacent nodes are connected through the at least one connection port of the plurality of nodes to form a plurality of links, and the routing method comprises:

transmitting identification information of the plurality of nodes and support rates of the at least one connection port of the plurality of nodes to the controller through the plurality of nodes;

receiving the identification information to construct a network topology diagram and receiving the support rate of the at least one connection port of the plurality of nodes through the controller;

monitoring data rates of the at least one connection port of the plurality of nodes through the controller;

receiving a route planning request through the controller;

respectively calculating costs of the plurality of links according to the data rates of the at least one connection port of the plurality of nodes and the support rates of the at least one connection port of the plurality of nodes after receiving the route planning request through the controller;

searching a plurality of candidate paths between a source-destination pair according to the route planning request and the network topology diagram through the controller;

summing the costs of the plurality of links passed by each candidate path to acquire a sum of link-cost of each candidate path through the controller; and selecting one of the candidate paths with the smallest sum of link-cost as a packet transmitting path between the source-destination pair.

2. The routing method of claim 1, wherein the step of monitoring the data rates of the at least one connection port of the plurality of nodes comprises:

receiving a first cumulative data rate of one of the at least one connection port of one of the plurality of nodes at a first time point through the controller; and receiving a second cumulative data rate of the one of the at least one connection port of the one of the plurality of nodes at a second time point through the controller.

3. The routing method of claim 2, wherein the step of respectively calculating the costs of the plurality of links comprises:

dividing the difference between the first cumulative data rate and the second cumulative data rate by the difference between the first time point and the second time point, so as to obtain an average data rate of the one of the at least one connection port of the one of the plurality of nodes through the controller;

subtracting the average data rate of the one of the at least one connection port of the one of the plurality of nodes from the support rate of the one of the at least one connection port of the one of the plurality of nodes, so as to obtain a residual data rate of the one of the at least one connection port of the one of the plurality of nodes through the controller; and dividing the residual data rate of the one of the at least one connection port of the one of the plurality of nodes by the support rate of the one of the at least one connection port of the one of the plurality of nodes through the controller, so as to acquire one of the costs of the links corresponding to the one of the at least one connection port of the one of the plurality of nodes.

4. The routing method of claim 1, wherein the step of selecting one of the candidate paths with the smallest sum of link-cost as the packet transmitting path between the source-destination pair through the controller comprises:

writing at least one packet forwarding rule respectively into at least one forwarding table of the one of the plurality of nodes passed by the one of the candidate paths with the smallest sum of link-cost according to the one of the candidate paths with the smallest sum of link-cost through the controller.

5. The routing method of claim 4, further comprising:

setting a failure time of the at least one packet forwarding rule through the controller, so that the packet transmitting path between the source-destination pair is updated along with time.

6. A network system, comprising:

a plurality of nodes, wherein each of the plurality of nodes comprises at least one connection port; every two adjacent nodes are connected through the at least one connection port of the plurality of nodes to form a plurality of links, the plurality of nodes are used for respectively outputting identification information of the plurality of nodes and support rates of the at least one connection port of the plurality of nodes to the controller; and a controller used for receiving the identification information to construct a network topology diagram, receiving the support rate of the at least one connection port of the plurality of nodes, monitoring data rates of the at least one connection port of the plurality of nodes, and receiving a route planning request; respectively calculating costs of the plurality of links according to the data rates of the at least one connection port of the plurality of nodes and the support rates of the at least one connection port of the plurality of nodes after receiving the route planning request; searching a plurality of candidate paths between a source-destination pair according to the route planning request and the network topology diagram; summing the costs of the plurality of links passed by each candidate path to acquire a sum of link-cost of each candidate path; and selecting one of the candidate paths with the smallest sum of link-cost as a packet transmitting path between the source-destination pair.

7. The network system of claim 6, wherein the controller is further used for receiving a first cumulative data rate of one of the at least one connection port of one of the plurality of nodes at a first time point; receiving a second cumulative data rate of the one of the at least one connection port of the one of the plurality of nodes at a second time point; and dividing the difference between the first cumulative data rate and the second cumulative data rate by the difference between the first time point and the second time point, so as to acquire an average data rate of the one of the at least one connection port of the one of the plurality of nodes.

8. The network system of claim 7, wherein the controller is further used for subtracting the average data rate of the one of the at least one connection port of the one of the plurality of nodes from the support rate of the one of the at least one connection port of the one of the plurality of nodes, so as to acquire a residual data rate of the one of the at least one connection port of the one of the plurality of nodes; and dividing the residual data rate of the one of the at least one connection port of the one of the plurality of nodes by the support rate of the one of the at least one connection port of the one of the plurality of nodes, so as to acquire one of the costs of links corresponding to the at least one connection port of the one of the plurality of nodes.

9. The network system of claim 6, wherein the controller is further used for respectively writing at least one packet forwarding rule respectively into at least one forwarding table of the one of the plurality of nodes passed by the one of the candidate paths with the smallest sum of link-cost according to the one of the candidate paths with the smallest sum of link-cost.

10. The network system of claim 9, wherein the controller is further used for setting a failure time of the at least one packet forwarding rule, so that the packet transmitting path between the source-destination pair is updated along with the time.

* * * * *